US005765993A

United States Patent [19]

Weiss

[11] Patent Number: 5,765,993
[45] Date of Patent: Jun. 16, 1998

[54] REPLACEMENT VANE ASSEMBLY FOR FAN EXIT GUIDE

[75] Inventor: Carl Weiss, Oakville, Conn.

[73] Assignee: Chromalloy Gas Turbine Corporation, San Antonio, Tex.

[21] Appl. No.: 721,472

[22] Filed: Sep. 27, 1996

[51] Int. Cl.[6] ........................................ F01D 9/04
[52] U.S. Cl. ........................ 415/209.2; 415/209.4; 415/191; 29/889.1; 29/889.22
[58] Field of Search .................... 415/189, 190, 415/209.2, 209.3, 209.4, 210.1, 191; 29/889.1, 889.22

[56] References Cited

U.S. PATENT DOCUMENTS

| 3,269,702 | 8/1966 | Nichols et al. | 415/189 |
| 3,442,442 | 5/1969 | Seiwert | 415/190 |
| 4,594,761 | 6/1986 | Murphy et al. | |
| 5,272,869 | 12/1993 | Dawson et al. | 415/209.4 |
| 5,411,370 | 5/1995 | Varsik | 415/209.4 |
| 5,474,419 | 12/1995 | Reluzco et al. | 415/209.4 |

FOREIGN PATENT DOCUMENTS 2084261 4/1982 United Kingdom ................ 415/189

Primary Examiner—Christopher Verdier
Attorney, Agent, or Firm—Mitchell D. Bittman

[57] ABSTRACT

Field replacement of a damaged outlet guide vane for redirecting helical airflow into axial flow in a turbofan engine is facilitated by utilizing a replacement vane assembly that includes an elongated replacement vane having first and second mounting platforms mounted at opposite ends of the vane. The first mounting platform is fixedly secured to the inner end of the vane and the second mounting platform is mounted so as to be movable from the outer end of the vane toward the inner end thereof. With the second mounting platform at the outer end of the vane, that mounting platform constitutes a substantial bulge which is positioned so as to limit the ability to maneuver the vane in a confined space. By moving the outer mounting platform toward the inner end of the vane, it is easier to maneuver the vane in a confined space and thereby facilitate entry of the outer mounting platform over the lip of and into the outer annular casing groove that partially defines the operating position for the replacement vane.

17 Claims, 7 Drawing Sheets

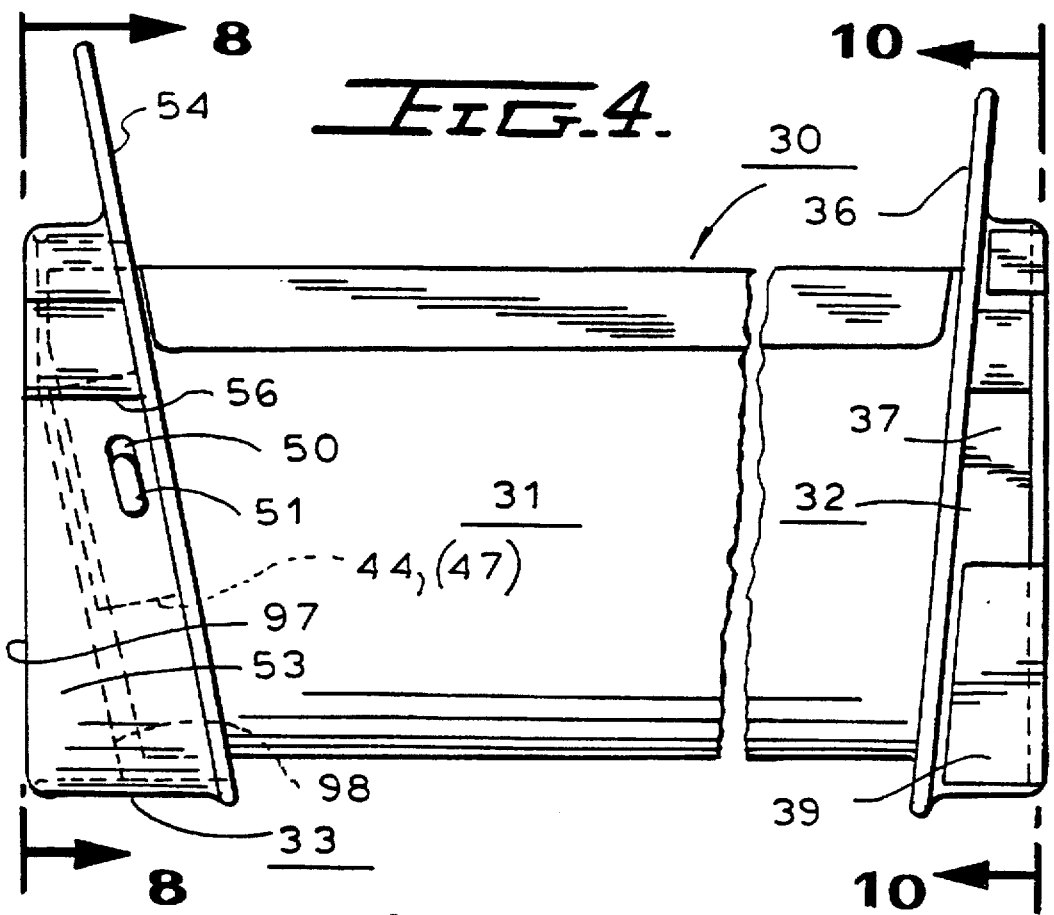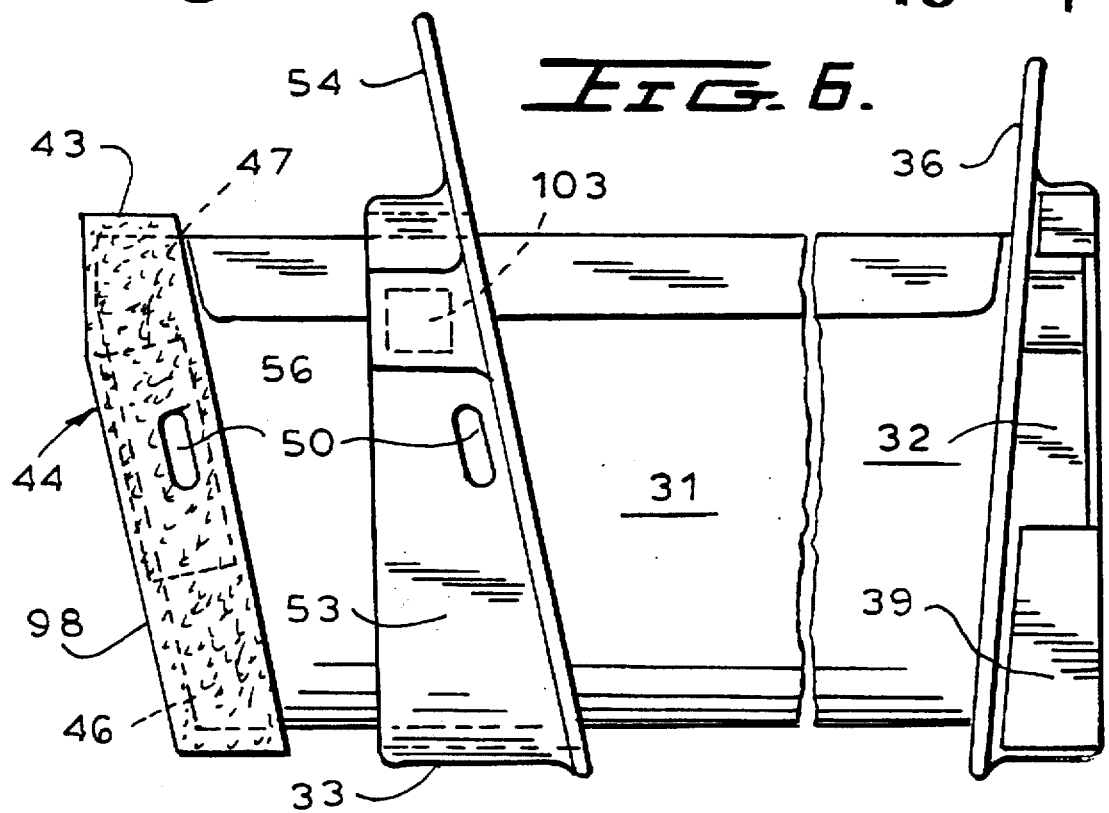

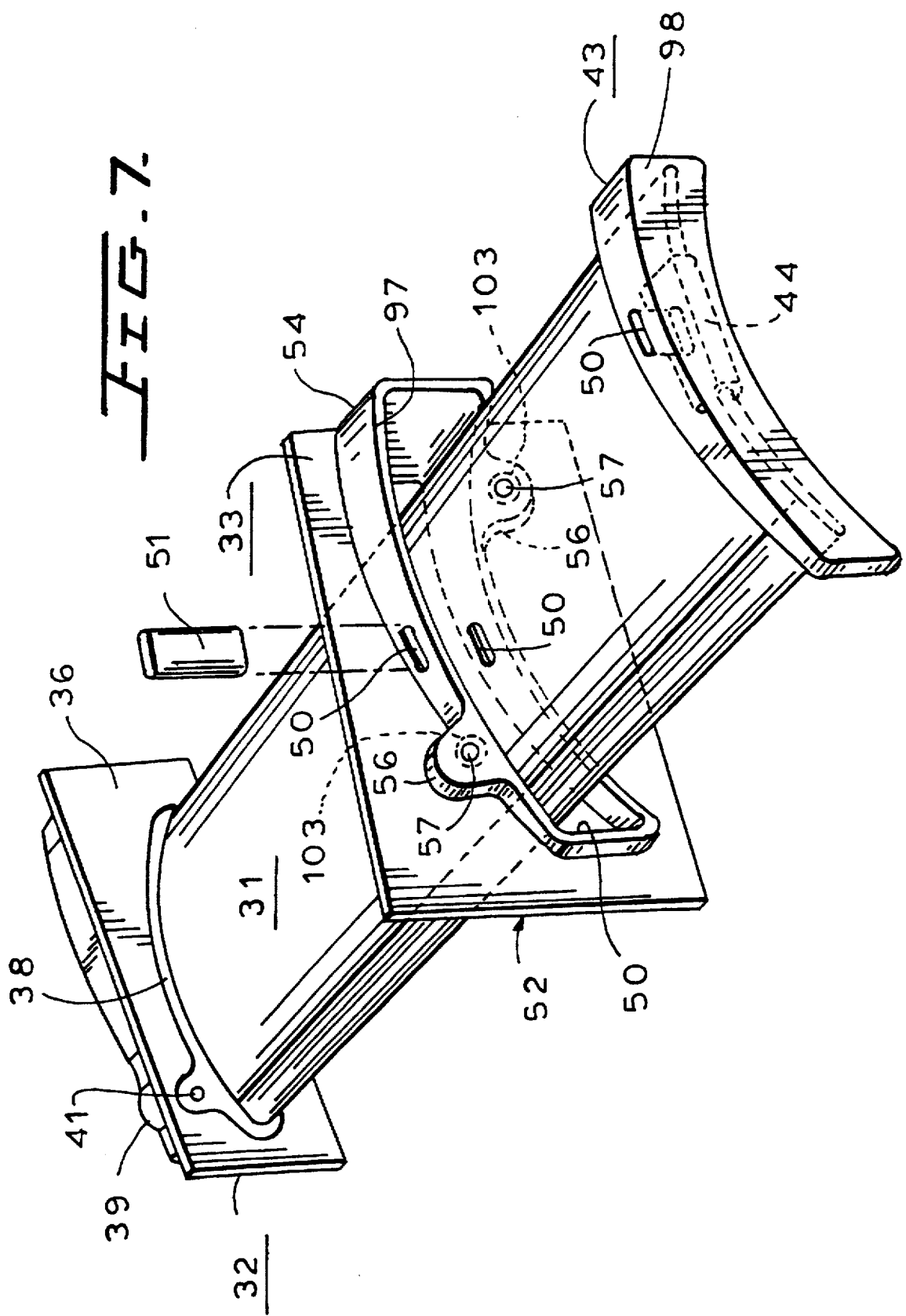

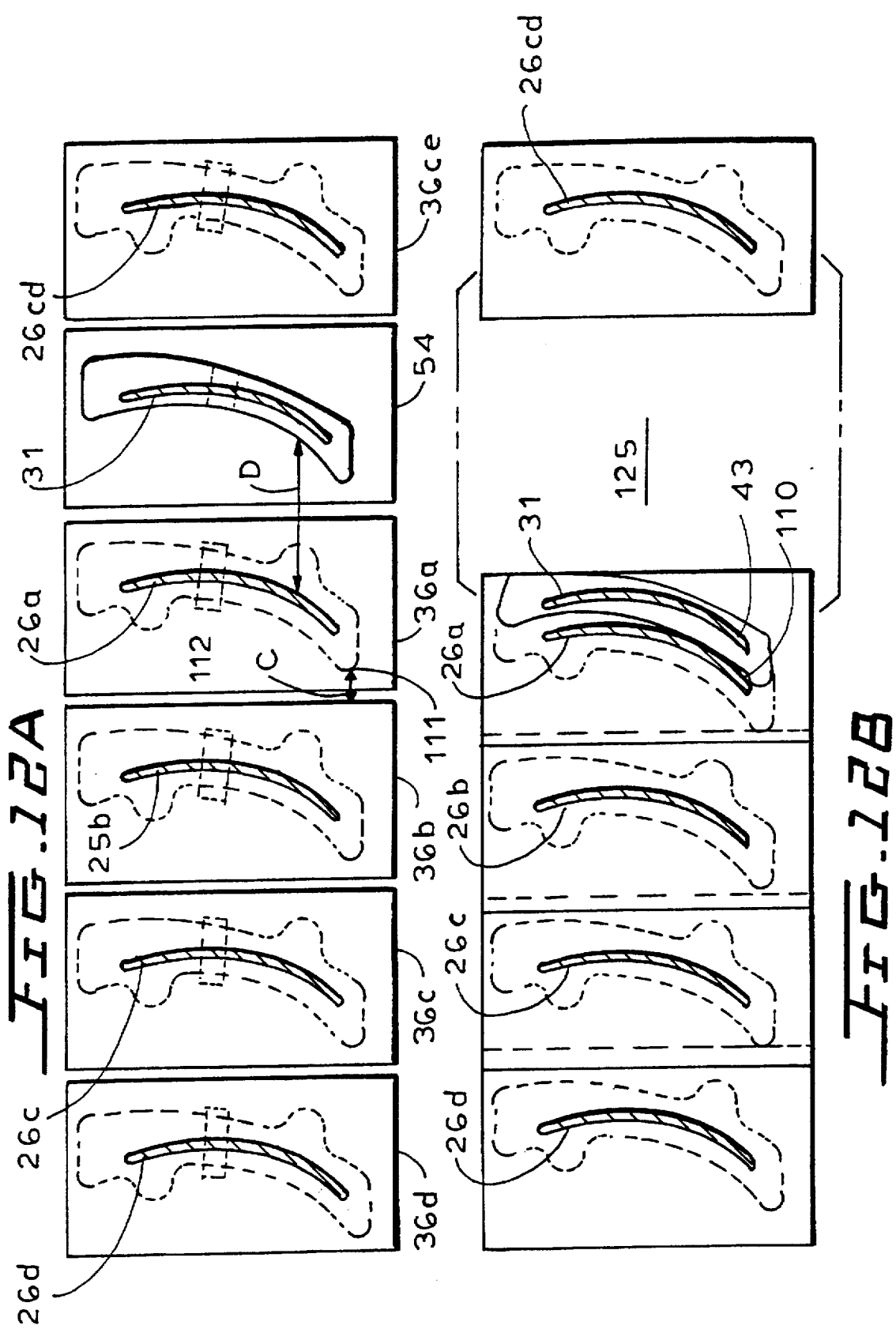

REPLACEMENT VANE ASSEMBLY FOR FAN EXIT GUIDE

BACKGROUND OF THE INVENTION

In general this invention relates to turbofan engines for aircraft and, more particularly, relates to a vane assembly constructed to facilitate field replacement of an outlet guide vane that redirects helical airflow into axial flow along the outside of the hot or core unit of the engine.

U.S. Pat. No. 4,594,761 issued Jun. 17, 1986 to G. C. Murphy, J. D. Jones and C. T. Salome for a Method of Fabricating Hollow Composite Air Foils, discloses a gas turbofan engine having outlet guide vane assemblies to redirect helical airflow into axial flow along the core engine portion. Large birds and other foreign materials passing through the engine at high speed often damage the guide vanes. Sometimes this damage is so severe that even though the damaged guide vanes may be repaired, making the repair requires special tools and rigs and/or cannot be done without removing the damaged vane from the engine. This is usually a costly procedure which often requires the aircraft to be taken out of service for an extended period of time.

In order to reduce engine down-time the prior art has provided a construction for air outlet guide vane units whereby the vanes thereof may be replaced in the field without dismounting the turbofan engine from the aircraft. In this prior art construction, if a guide vane is damaged beyond repair it is cut into a number of pieces which are detached from the concentric inner and outer cases that define an annular space therebetween, with the guide vanes extending radially across such annular space.

The inner end piece of the vane merely slides off of an associated set of two registration pins that project radially outward or toward the outer case from the inner case, while the outer end piece of the vane is separated from the outer case by removing two associated fastening screws that secure the outer end of the vane and extend radially inward or toward the inner case from the outer case.

In its operating position, each guide vane extends radially from the rotational axis of the engine's rotor and the opposite ends of each guide vane are disposed in respective shallow outward and inward facing annular guide grooves of the respective inner and outer cases. Because of this, a vane that is intact cannot be removed by merely moving same axially (parallel to the rotational axis), nor can a complete blade be inserted into its radially extending operative position by moving same axially.

Thus, it is necessary to develop a space that will permit a replacement vane to tilt angularly about a tilt axis which is generally parallel to and radially offset from the rotational axis. Such space must be large enough to permit moving an axially tilted new or replacement vane parallel to the engine axis (axially) into position aligned with and between the guide grooves of the inner and outer cases. Thereafter, the new vane is tilted angularly until it is in its operative radial position. In order to develop a space sufficient to permit this maneuvering of the replacement vane, the vanes adjacent to the position that will be occupied by the replacement vane are pivoted angularly about their inner ends, with their outer ends traveling in the guide groove of the outer case. However, this tilting of the adjacent vanes is limited in that the outer ends of these vanes contain mounting platforms each of which includes a plate-like base that extends substantially sidewise of the vanes. In particular, the base of each platform extends almost half the angular distance toward the vane that is adjacent to the vane from which the particular base extends.

The platform also includes a housing which extends radially outward of the base into one of the guide grooves and is located in such a position that as a first vane assembly is tilted angularly towards a second vane assembly disposed adjacent thereto, the housing at the outer end of the first platform engages the base at the outboard end of the second vane to severely limit angular tilting of the first vane relative to the second vane.

Because of this motion limiting action, when it becomes necessary to use a prior art replacement vane assembly to replace one vane in a commonly used array of eighty-four vanes, approximately twenty vanes must be tilted in order to create a space that is large enough to permit the replacement vane to tilt sufficiently so that when its inner end is engaged with its associated set of indexing pins, the outer end of the replacement vane is clear of the guide groove in the outer case. Detaching and tilting approximately twenty out of eighty-four vanes, and then returning the tilted vanes to their operative radial positions, is a laborious and time consuming operation.

SUMMARY OF THE INVENTION

According to the instant invention, the time consuming laborious vane changing operation previously described is substantially simplified and shortened to the point where a vane may be changed by manipulating many fewer vanes than the twenty or so vanes that had to be unfastened and tilted when using the prior art techniques. That is, according to the instant invention the replacement vane and in the neighborhood of only four additional vanes need be moved in order to replace a seriously damaged vane or a vane that cannot be repaired without removing same. More particularly, the instant invention provides a replacement vane assembly that includes an inner platform which is fixedly mounted to the inner end of the vane and an outer platform which is mounted on the vane so as to be movable during a replacement operation, from the outer end of the vane for a substantial distance along the length of the vane toward the inner end thereof.

During installation of the replacement vane, the mounting platform at the outer end is moved toward the inner end so that substantially less material protrudes from the outer end of the replacement vane and the shape of that protruding material is such that greater tilting of the replacement vane is achieved as compared to tilting of prior art replacement vanes. That protruding material is a resilient synthetic pad which is normally disposed within the housing.

In particular, tilting of the prior art replacement vane is limited by engagement of the housing on the outer platform of the replacement vane with the near edge of the base on the outer platform of the adjacent vane whereas tilting of the instant replacement vane is limited by engagement of the synthetic pad on the outer end of the replacement vane with the adjacent vane. In cross-section transverse to the longitudinal axis of the vane, the pad is somewhat smaller than the housing and is shaped to avoid engagement with the base of the outer platform of the adjacent vanes and be positioned inboard of such base. The shape of the pad also permits vane replacement requiring a lesser tilt angle for the replacement vane. After the replacement vane of the instant invention is moved axially into alignment with the guide grooves, the outer platform is moved to its operative radial position at the outer end of the replacement vane and is then secured fixedly thereto. Thereafter, the replacement vane is tilted into the angular operational position of the damaged vane and is then secured by screws to the outer case.

Accordingly, the primary object of the instant invention is to provide a replacement vane assembly that is constructed to facilitate installation thereof in place of a damaged vane unit in an exit air guide arrangement.

Another object is to provide a replacement vane assembly of this type in which there is a vane having two mounting platforms, one of which is fixed to the vane at its inner end and the other of which, during replacement vane installation, is movable along the vane between the outer end thereof and an installation position that is a substantial distance toward the inner end of the vane.

Yet another object is to provide a replacement vane assembly of this type in which the platform at the outer end of the vane includes a transverse base and a housing extending outside of said vane with the outer pad inside of such housing with an extensive portion of the latter extending outward of said outer pad.

Still another object is to provide a replacement vane assembly of this type in which there is a platform at each end of an elongated vane and a synthetic pad interposed between each of the platforms and the vane. Another object is to provide a first mounting platform which is provided with at least one indexing recess which cooperates with an indexing formation and a second mounting platform which is provided with at least one securing formation that cooperates with a securing element.

A further object is to provide a replacement vane assembly of this type in which there is a mechanical securing device that is applied, after the vane assembly is in operative position, to secure the outer platform at the outer end of the vane.

A still further object is to provide a replacement vane assembly of this type in which the securing device is a pin having an elongated cross-section, which pin extends through complementary apertures in the arms of a reinforcing U-shaped metal bracket that is bonded rigidly to the vane and is embedded in a synthetic pad that is secured to the outer end of the vane.

These objects as well as other objects of this invention shall become readily apparent after reading the following description of the accompanying drawings in which:

BRIEF DESCRIPTION OF THE DRAWINGS

FIG. 4 is a side elevation of a replacement vane assembly constructed in accordance with teachings of the instant invention, with the movable platform thereof positioned in its operative radial position at the outer end of the vane.

FIG. 6 is a side elevation of the replacement vane assembly with the movable platform thereof disposed substantially inward of the vane's outer end.

FIG. 7 is a perspective of the replacement vane assembly with the elements thereof occupying the respective positions shown in FIG. 6.

FIGS. 12A and 12B are fragmentary simplified schematic cross-sections taken through line 12, 12 of FIG. 11 looking in the direction of arrows 12, 12. In FIG. 12A the vane assemblies are shown in their evenly spaced normal operating positions, while in FIG. 12B the van assemblies shown are tilted angularly in order to provide room to maneuver the replacement vane assembly during installation thereof.

DETAILED DESCRIPTION OF THE INVENTION

Figure 1:
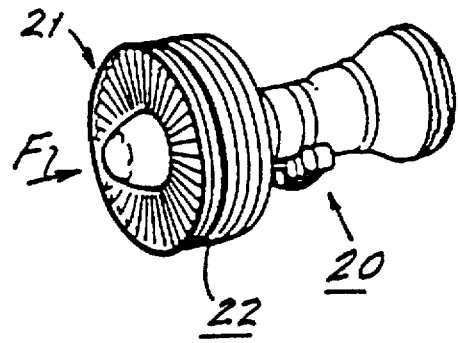
FIG. 1 is a perspective, with cowling removed, of a gas turbofan engine wherein the replacement vane assembly of the instant invention is installed.
Figure 2:
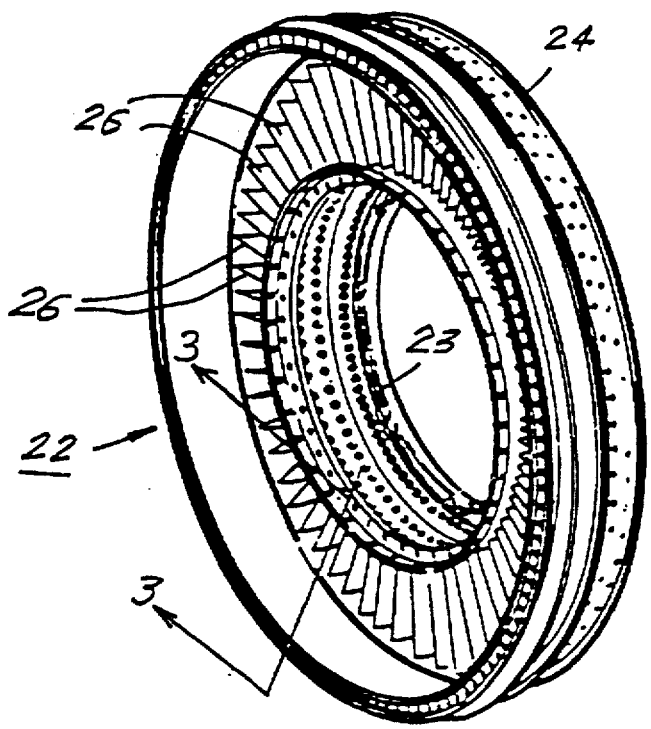
FIG. 2 is an enlarged perspective of the fan exit case and vane assembly of the engine in FIG. 1.

Now referring to the drawings in which FIG. 1 illustrates gas turbofan engine 20 of a type known to the art which includes a generally central hot core unit (not shown) disposed within an arrangement of three aligned fan cases 21 that are provided to contain and direct a fan discharge airstream and to provide a structural link between the air frame and the core engine. Fan exit case and vane assembly 22 (FIG. 2) comprises a substantial portion of fan case arrangement 21.

Figure 3:
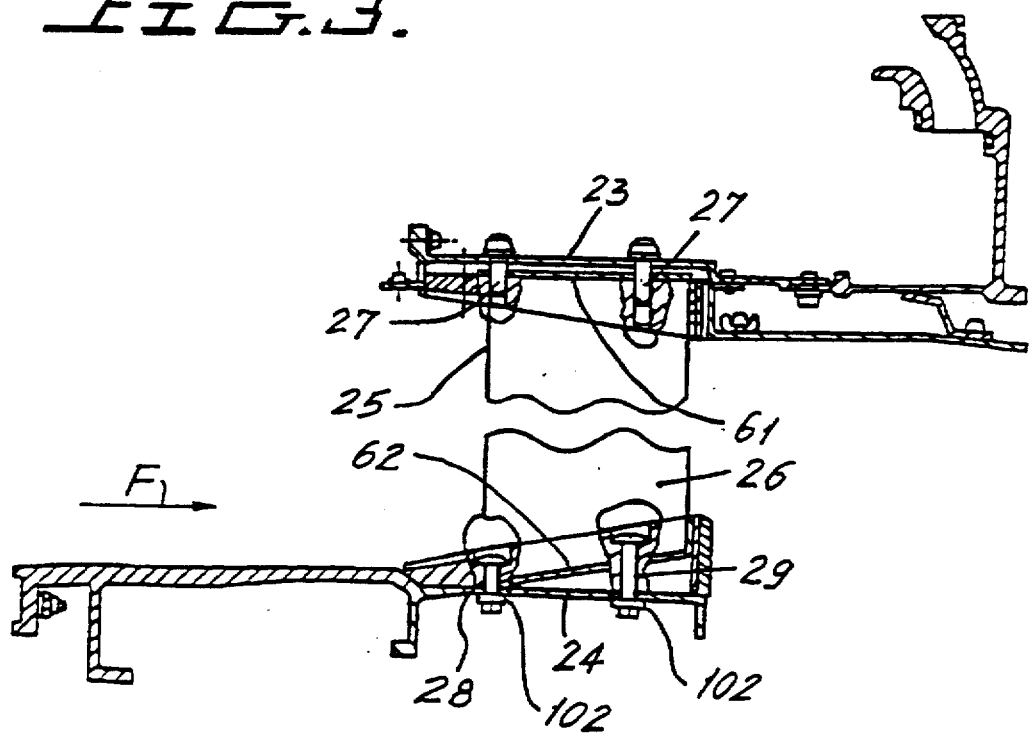
FIG. 3 is a fragmentary cross-section taken through line 3—3 of FIG. 2 looking in the direction of arrows 3—3.

Assembly 22 includes concentric inner and outer cases 23, 24 which define annular space 25 therebetween. An array of airfoil shaped vanes 26 constructed of lightweight composite material extend radially across space 25 with equal angular spaces separating adjacent vanes 26. In an array of eighty four vanes center-to-center spacing between adjacent vanes 26 is approximately 4.3° The inner end of each vane 26 is operatively positioned by two registration pins 27, 27 (FIG. 3) that extend outwardly from inner case 23, and the outer end of each vane 26 is operatively positioned by two securing elements 28, 29 that project outwardly through outer case 24 to be engaged by nuts 102, 102. In an alternate embodiment, screws extending inward through outer case 24 are received by threaded inserts, such as inserts 103, 103 that are embedded in movable platform 33 (FIGS. 5–8) of replacement vane assembly 30. The exit air guide arrangement constituted by the plurality of vanes 26 (26a, 26b, etc.) converts input (upstream) helical airflow into output (downstream) axial flow along the outside of the core of engine 20.

Quite often when one of the vanes 26 is damaged, a replacement vane must be installed in the field where the engine cannot be removed from the aircraft. For that purpose, and in accordance with the instant invention, replacement vane assembly 30, seen more particularly with reference to FIGS. 4 through 10, is provided.

Figure 11:
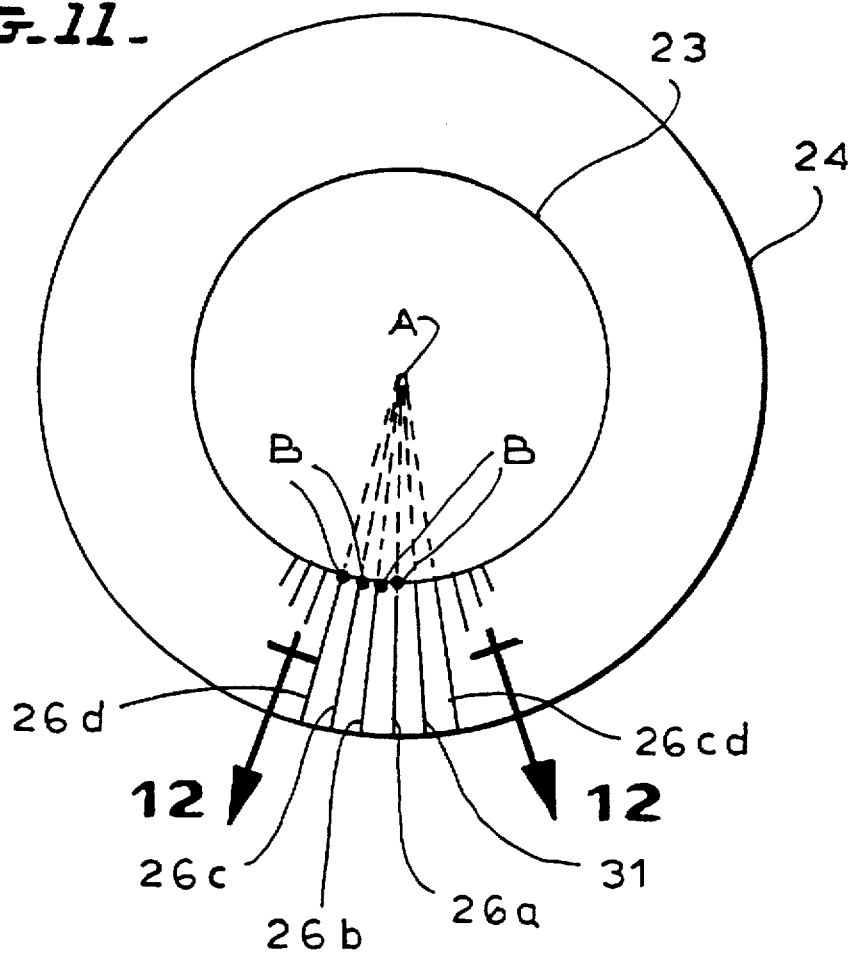
FIG. 11 is a fragmentary simplified schematic looking axially at the entrance side of an exit air guide that includes a replacement vane assembly constructed according to the instant invention.
Figure 10:
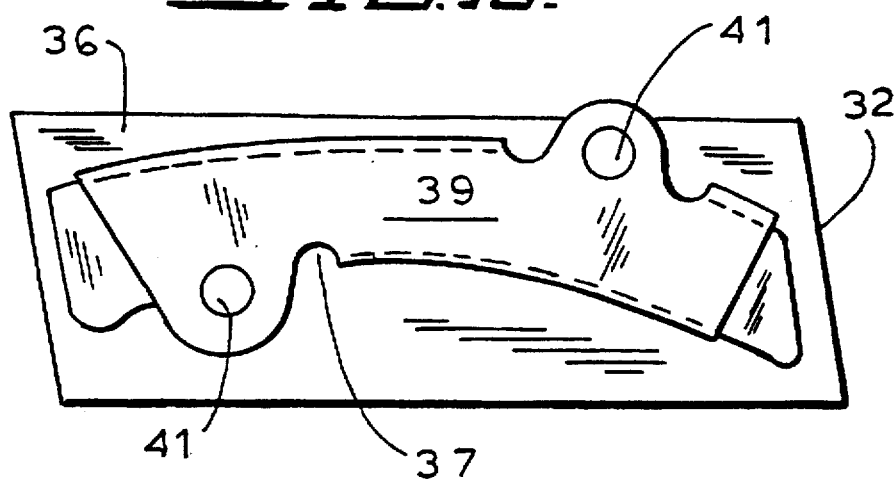
FIG. 10 is an end view looking in the direction of arrows 10—10 of FIG. 4.

Assembly 30 comprises elongated vane 31 having inner and outer mounting platforms 32, 33 at opposite ends thereof. In the following description of assembly 30, inner and outer are relative terms that are referenced to each vane 31 in its operational position radiating from rotational axis A (FIG. 11) of engine 20. Platform 32 is fixedly mounted to vane 31 and, for reasons to be hereinafter explained, platform 33 is mounted to vane 31 so as to be movable lengthwise thereof during installation of replacement assembly 30. Platform 32 includes transverse plate-like base 36 and housing 37 that projects inboard from the inner surface of base 36. The inner end of vane 31 projects into an aperture that extends through base 36 and housing 37 where the inner end of vane 31 is encased in pad 38 that is constructed of relatively stiff yieldable synthetic material such as polyurethane. Metal cap 39 is mounted to housing 37 and extends over the inner end thereof. A pair of bores or indexing recesses 41, 41, each of which receives one of the registration pins 27, 27, extends through cap 39 and pad 38.

Another pad 43, constructed of relatively stiff yieldable material such as polyurethane, encapsulates the outer end of vane 31 and U-shaped metal bracket 44 is provided with at least one aperture formation and is bonded to vane 31 by relatively rigid layers 87, 87 (FIG. 9) of epoxy material. The outer end of vane 31 engages web 46 of bracket 44 (FIG. 9) and parallel arms 47, 47 of bracket 44 have vane 31 positioned therebetween. As will hereinafter be seen, when replacement vane assembly 30 is installed in its final angular operational position, platform 33 thereof (FIG. 4) is positioned at the outer end of vane 31, being secured thereto by pin 51 that is elongated in transverse section and extends through aligned aperture sections 50 in vane 31, pad 43, epoxy layers 87, 87, bracket arms 47, 47 of bracket 44 and housing portion 53 that projects outboard from the outer surface of transverse plate-like base 54 of platform 33. Pad 43 is disposed within passage 55 that extends through housing 53 and base 54 of platform 33. The transverse cross-section of passage 55 is complementary to the outer surface of pad 43 so that platform 33 may slide lengthwise of vane 31 and relative to pad 43 during installation of vane assembly 30 for reasons that shall become apparent. Projecting from opposite sides of housing 53 are bosses 56, 56, each of which is provided with a threaded insert 57 that threadably receives an individual one of the fastening screws 28, 29 to mechanically secure vane assembly 30 to outer case 24. A cement such as air vulcanized rubber secures pin 51 in its operative holding position, and a bead (not shown) of this same cement may be applied at the intersection between pad 43 and the inward facing surface of base 54.

Groove 61 is formed in inner case 23 and faces outward while groove 62 is formed in outer case 24 and faces inward. With replacement vane assembly 30 installed, inner and outer platform housings 37, 53 are disposed in respective annular casing grooves 61, 62 (FIG. 3) and using axis A of engine 20 as a center, vane 31 projects radially across annular space 25 between cases 23 and 24. Tightening of screws 28, 29 forces the outer end of platform housing 53 against the bottom of groove 62. Lightweight fairing elements (not shown) may be provided to surround each of the housings 37, 53 on vane 31 as well as the housings on vanes 26.

Figure 13:
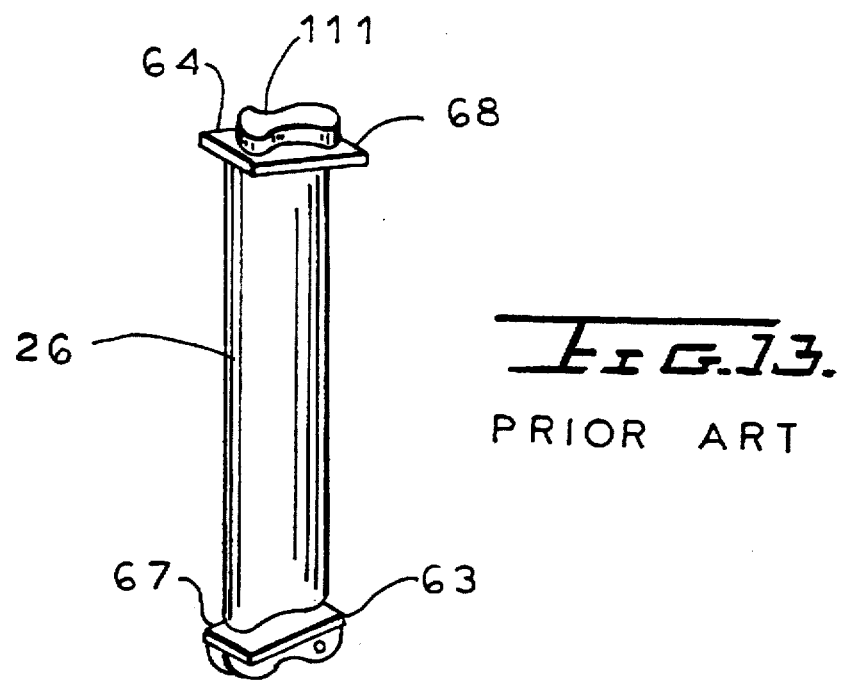
FIG. 13 is a perspective of a conventional vane assembly.
Figure 8:
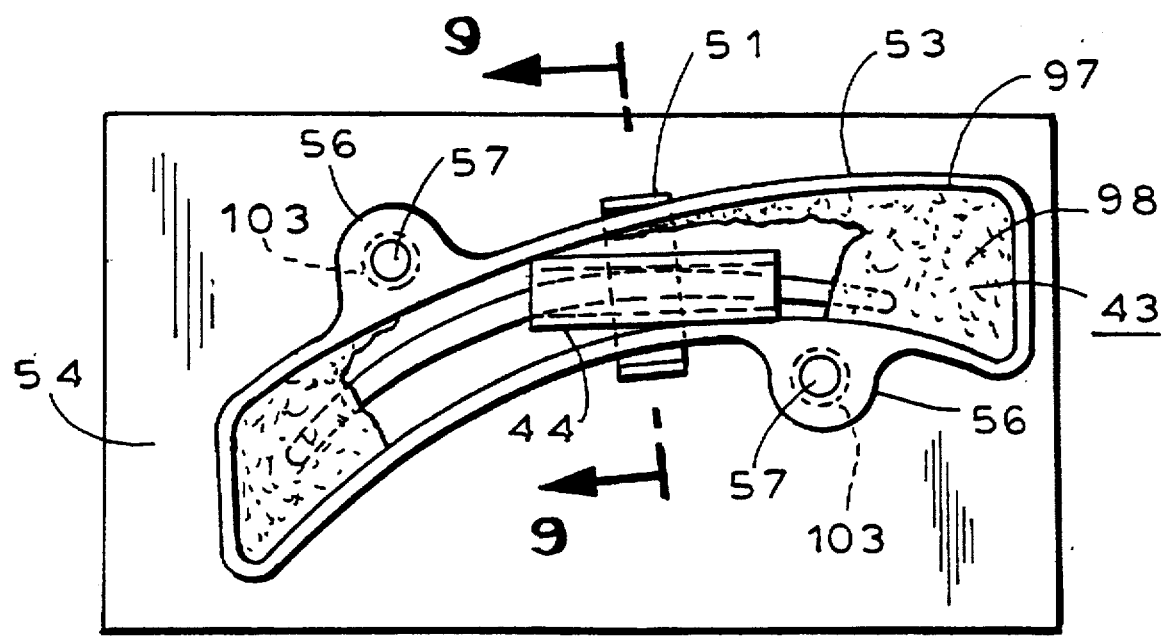
FIG. 8 is an end view of the replacement vane assembly looking in the direction of arrows 8—8 of FIG. 4.
Figure 9:
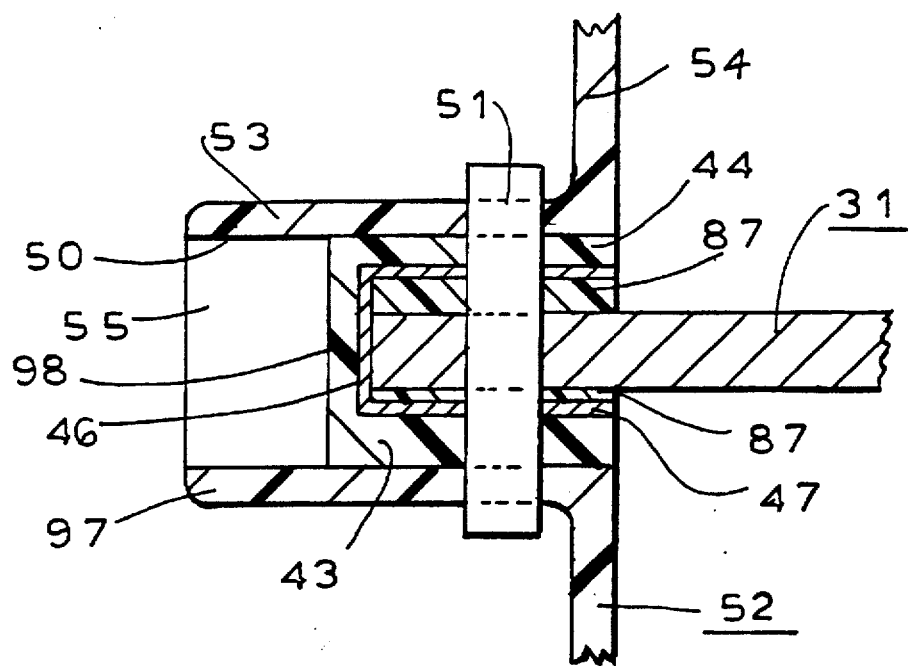
FIG. 9 is an enlarged fragmentary cross-section taken through lines 9—9 of FIG. 8 looking in the direction of arrows 9—9.

Bases 36 and 54 are slanted in opposite directions relative to the longitudinal axis of vane 31. Similarly, bases 67, 68 are slanted in opposite directions relative to the longitudinal axis of vane 26. Plate-like bases 36, 54 of respective platforms 32, 33 are in circular alignment with bases 67, 68 (FIG. 13) of respective platforms 63, 64 at the respective inner and outer ends of each vane 26. As distinguished from outer platform 33 which can be moved lengthwise of vane 31 to facilitate installation of replacement assembly 30, neither inner nor outer platforms 63, 64 can be moved lengthwise of vane 26. Because of this, in order to install or remove a vane 26, it must be tilted angularly a relatively great amount about a center located at inner case 23 in order to withdraw the housing of outer base from outer groove 62.

Figure 5:
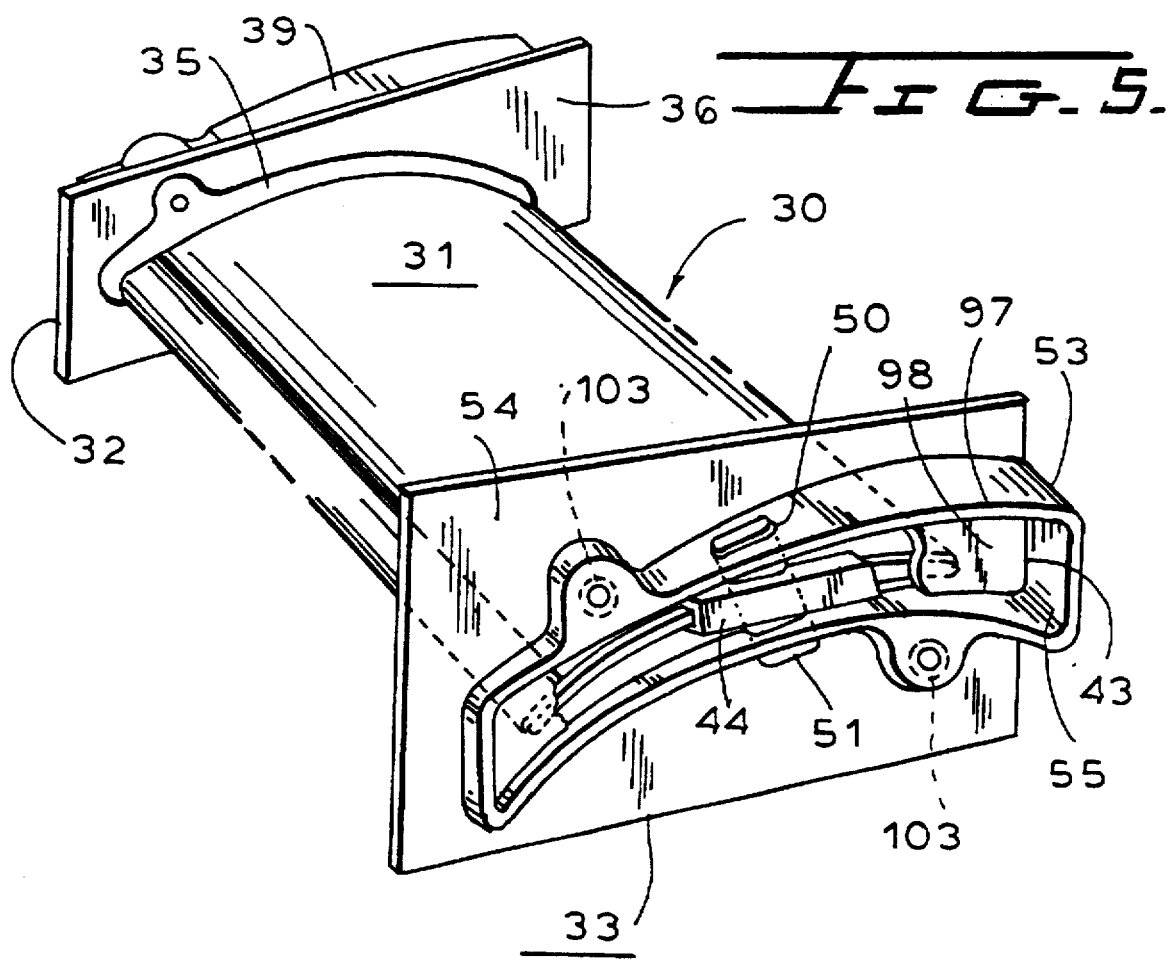
FIG. 5. is a perspective of the replacement vane assembly with the elements thereof occupying the respective positions shown in FIG. 4.

Referring particularly to FIGS. 4–6 it is seen that while the peripheral surface of pad 43 is closely fitted to the interior surface of housing 53, a major portion 98 at the outboard end of pad 43 is depressed so as to be considerably inboard of the outboard end 97 of housing 53. With this arrangement, to move vane 31 angularly about pivot B toward vane 26a, first assembly 30 is moved radially inward toward indexing or registration pins 27, 27 that form pivot B. Then guide vane 31 is tilted clockwise about pivot B toward vane 26a(FIG. 11) having fixed outboard platform 64 with base 68. As this occurs, pad 43 moves inboard of base 68 and engages vane 26a at point 110 (FIG. 12B) to stop further clockwise motion of vane 30 after moving distance D (FIG. 12A) relative to vane 26a.

In contrast, pivotal movement between adjacent vanes 26 having fixed platforms 63, 64 at both ends thereof is limited to distance C (FIG. 12A) when outward projecting housing 111 engages edge 112 of base 68. Clearly distance D is many times greater than distance C. Clearly, with outer platform 33 moved inward as in FIG. 12B, vane 31 is able to pivot clockwise through a much greater angle than when pivoting of vane assembly 30 is done with platform 33 secured at the outer end of vane 31, as in FIG. 12A. It is noted that in practice the distance ratio D/C is many times the ratio D/C that is taken by taking measurements of the schematics of FIGS. 12A and 12B. With this arrangement, space 125 that is required to maneuver replacement vane 31 into position is less when outer platform 33 is moved inboard. Incremental movement of vanes 26 to obtain space 125 is done in the conventional manner, with the outer base of each vane 26 that is moved being shingled to a position above the base of the adjacent vane 26 that is more remote from space 125.

While this invention has been described as using a single pin 51 of elongated transverse cross-section to mechanically secure outboard casing 33 to vane 31, that single pin 51 may be replaced by an array of two or more closely arranged pins (not shown) each of a relatively small circular cross-section. Space permitting, for some application a single relatively large diameter circular pin may be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A replacement vane assembly that is used to replace a damaged vane unit of an exit air guide in which a plurality of angularly spaced vane units are in operating positions extending radially across an annular space between concentric inner and outer cases, said replacement vane assembly including:

an elongated replacement vane having a first end and a second end opposite said first end, first and second mounting platforms mounted on said elongated vane;

said first mounting platform being fixedly secured to said replacement vane at said first end thereof; and prior to installation of said replacement vane in a predetermined angular operating position in place of said damaged unit, said second mounting platform being mounted on said replacement vane for movement longitudinally of said elongated vane between an operative radial position at said second end and an installation position that is a distance away from said second end in a direction toward said first end.

2. A replacement vane assembly as set forth in claim 1 in which said second mounting platform is provided with a through passage wherein said elongated vane moves as said second mounting platform moves longitudinally of said replacement vane.

3. A replacement vane assembly as set forth in claim 2 in which said second mounting platform and said replacement vane are provided with fastening formations that cooperate with a fastening device which maintains said second mounting platform in said operative position at said second end when said replacement vane assembly is fully installed as part of said exit air guide.

4. A replacement vane assembly as set forth in claim 3 in which said fastening formations include apertures in said second mounting platform and said replacement vane, said apertures being in operative alignment to receive said fastening device and cooperate therewith to maintain said second mounting platform in said operative radial position at said second end when said replacement vane is fully installed in said operative position as part of said exit air guide.

5. A replacement vane assembly as set forth in claim 2 in which said vane assembly also includes a first pad at said first end of said replacement vane and a second pad at said second end of said replacement vane, said first and second pads surrounding said replacement vane;

said first pad being fixed inside of said first mounting platform, said second pad being inside of said through passage when said second mounting platform is at said operative radial position at said second end, and said second pad being separated from said second mounting platform when said second mounting platform is in said installation position.

6. A replacement vane assembly as set forth in claim 4 in which said vane assembly also includes a first pad at said first end of said replacement vane and a second pad at said second end of said replacement vane, said first and second pads surrounding said replacement vane, said first pad being fixed inside of said first mounting platform, said second pad being inside of said through passage when said second mounting platform is at said operative radial position at said second end, and said second pad being separated from said second mounting platform when said second mounting platform is in said installation position;

said second pad including an aperture that is aligned with said aperture of said elongated vane which receives said fastening device, with said fastening device also cooperating with said aperture of said second pad to maintain said second mounting platform in said operative radial position at said second end when said replacement vane is fully installed as part of said exit air guide.

7. A replacement vane assembly as set forth in claim 6 in which said vane assembly also includes a bracket that is imbedded in said second pad and is provided with at least one aperture formation aligned with said aperture of said second pad to receive said fastening device, with said fastening device also cooperating with said at least one aperture of said bracket to maintain said second mounting platform in said operative radial position at said second end when said replacement vane is fully installed as part of an exit air guide.

8. A replacement vane assembly as set forth in claim 7 in which said bracket is U-shaped in cross section and includes spaced arms between which said second end of said elongated vane is disposed.

9. A replacement vane assembly as set forth in claim 1 in which said first mounting platform is provided with at least one indexing recess, each recess of said at least one indexing recess being operatively constructed to receive and cooperate with an indexing formation that projects radially outward from said inner case of said exit air guide arrangement wherein said replacement vane assembly is installed.

10. A replacement vane assembly as set forth in claim 9 in which said second mounting platform is provided with at least one securing formation, each formation of said at least one securing formation being operatively constructed to be engaged by and cooperate with a securing element that projects radially inward from said outer case of said exit air guide arrangement wherein said replacement vane assembly is installed.

11. A replacement vane assembly as set forth in claim 5 in which each of said pads is constructed of a relatively stiff elastomer.

12. A replacement vane assembly as set forth in claim 1 in which said first and second mounting platforms include respective first and second plate-like bases that are transverse to said replacement vane when said replacement vane assembly is fully installed as part of said exit air guide.

13. A replacement vane assembly as set forth in claim 12 in which said first and second bases include respective first and second generally planar surfaces that face each other;

said planar surfaces lying in intersecting planes which are slanted in opposite directions relative to the longitudinal axis of said replacement vane when said replacement vane assembly is fully installed as part of said exit air guide.

14. A replacement vane assembly as set forth in claim 4 in which said elongated vane includes a lengthwise dimension and each of said apertures of said fastening formation has a transverse cross-section that is elongated in a direction transverse to said lengthwise dimension of said elongated vane.

15. A replacement vane assembly as set forth in claim 12 in which said first and second mounting platforms include a first housing extending radially inward from said first base and a second housing extending radially outward from said second base respectively;

said replacement vane assembly also including first and second pads disposed inside the respective first and second housings when said replacement vane assembly is fully installed as part of said exit air guide, and said second pad being separated from said second mounting platform when said second mounting platform is in said installation position at which time said second pad is at said second end of said replacement vane;

with said second mounting platform in said operative radial position a portion of said second pad being substantially inboard of a portion of said second housing to facilitate the installation of said replacement vane assembly in said exit air guide.

16. A replacement vane assembly as set forth in claim 7, in which said bracket is adhered rigidly to said elongated vane at said second end thereof.

17. A replacement vane assembly as set forth in claim 8, in which said arms, respectively, are adhered rigidly to opposite surfaces of said elongated vane at said second end thereof.

* * * * *